United States Patent Office 3,347,935
Patented Oct. 17, 1967

3,347,935
TERPENE PHENOLIC RESINS
Josef Kaupp and Kurt Blaettner, Gersthofen, near Augsburg, Germany, assignors to Farbwerke Hoechst Aktiengesellschaft vormals Meister Lucius & Bruning, Frankfurt am Main, Germany, a corporation of Germany
No Drawing. Filed May 29, 1963, Ser. No. 283,955
7 Claims. (Cl. 260—619)

The present invention relates to a process for preparing terpene phenolic resins.

It is known to alkylate phenols with terpene hydrocarbons under the catalytic action of strong acids, metal salts having a condensing effect, bleaching earths or Friedel-Craft's catalysts.

The present invention provides a process for preparing terpene phenolic resins according to which a phenol which has at least two free ortho- and/or para-positions with respect to a hydroxyl group is reacted in known manner, in the presence of a Friedel-Craft's catalyst, in particular boron trifluoride or a coordination compound thereof, with dicyclopentadiene at a temperature below the depolymerization temperature of the dicyclopentadiene; the resulting reaction mixture is reacted in the presence of, preferably, the same catalyst as has been used in the first operation, with a mono- or bicyclic terpene, and the terpene phenolic resin is isolated, preferably by distillation.

All mono- or polyvalent phenols which have at least two free ortho- and/or para-positions with respect to the hydroxyl group or one of their hydroxyl groups can be used for the reaction. The phenols may be alkylated in the nucleus, that is to say, they may contain one or more straight-chain or branched alkyl groups with preferably 1 to 15 carbon atoms. As examples of such phenols may be mentioned phenol, alpha-naphthol, beta-naphthol, ortho-, para- and meta-cresol, 1.2.4-xylenol (3.4-dimethyl phenol), 1.3.5-xylenol (3.5-dimethyl phenol), the different butyl- and isononyl phenols, dedecyl phenol, resorcinol, pyrocatechol, and hydroquinone. Hydroxylated diphenyls, for example, p,p'-dihydroxy diphenyl may also be used. Phenol mixtures, for example, commercial cresol, are also suitable. Preferably, phenols containing one or two nuclei are used.

Suitable catalysts are the known Friedel-Craft's catalysts, for example, aluminium chloride, aluminium bromide, zinc chloride, iron trichloride and tin tetrachloride and mixtures of these compounds. Particularly preferred are boron trifluoride and its coordination compounds such as those of dialkyl ethers of low molecular weight, for example, boron trifluoride diethyl etherate, those of aliphatic carboxylic acids of low molecular weight, for example, the coordination compound of one molecule of boron trifluoride and two molecules of acetic acid, those of phenols and the like. The said catalysts are preferably used in a quantity within the range of 0.2 to 2%, calculated on the total weight of the reactants.

The terpene hydrocarbons that are suitable for use in the reaction may be of the monocyclic series or of the bicyclic series and contain at least one olefinic double bond in the molecule. There are preferably used mono- and bicyclic terpene hydrocarbons of the summation formula $C_{10}H_{16}$, for example, d-limonene, l-limonene, d,l-limonene, dipentene, terpinolene, α-terpinene, β-terpinene, γ-terpinene, silvestrene, carvestrene, α-pinene, β-pinene, carene and in particular camphene. Mixtures of the aforesaid terpene hydrocarbons may also be used.

The molar ratios in which the reactants phenol, dicyclopentadiene and terpene hydrocarbon are subjected to the reaction may vary within wide limits. It has proved to be particularly favorable to react the phenol and dicyclopentadiene in a molar ratio of about 2:1 and then to add the terpene hydrocarbon in such a molar quantity as corresponds to the o- and p-positions that are still free in the phenol radicals of the resulting alkylation products, i.e. such a quantity as is necessary for alkylating each of these positions by one molecule of terpene hydrocarbon. For example, if a reaction product of two mols of phenol and one mol of dicyclopentadiene is prepared which still has 4 free o-positions or o- and p-positions 4 mols of terpene hydrocarbons are added during the subsequent reaction whereas as alkylation product obtained from two mols of o-cresol and one mol of dicyclopentadiene which has no more than altogether two free o- and/or p-positions is preferably reacted with two mols of terpene hydrocarbon. It is, however, not necessary to apply these preferred molar ratios. Useful phenol resins may also be obtained when the reactants are used in other molar ratios, for example, when terpene hydrocarbon is used in a deficiency with respect to the free o- and/or p-positions of the alkylation product.

The temperatures used in the reaction of the phenol with dicyclopentadiene and in the subsequent reaction of the resulting alkylation product with terpene hydrocarbon are advantageously below the depolymerization temperature of dicyclopentadiene. The temperatures are then in general within the range of 50° to 140° C. and preferably within the range of 80° to 130° C.

The reaction is normally carried out under atmospheric pressure. Higher pressures may be applied and when low-boiling solvents are used the application of higher pressure is indicated.

The reaction may be carried out in the absence or presence of solvents that are inert towards the reaction. The solvent is advantageously added immediately before or during the addition reaction of the terpene hydrocarbon in order to keep the reaction mixture thinly liquid and stirrable. As solvents may be used the organic solvents that are usually applied in Friedel-Craft's reactions and which are liquid at the reaction temperature used, such solvents being in particular aliphatic, cycloaliphatic or aromatic hydrocarbons, for example benzine (petrol, ligroin etc.), cyclohexane, toluene and xylene, carbon disulfide and nitrobenzene being likewise suitable for use.

It is advantageous to carry out the reaction as far as possible with the exclusion of moisture. It is also indicated to carry it out with the exclusion of air by operating, for example, under an atmosphere of nitrogen, but this is not absolutely necessary. When air is admitted the resins which form have a darker colour.

An advantageous way of carrying out the process according to the invention will now be described.

The catalyst is added to the phenol, and to the mixture thus obtained dicyclopentadiene is added dropwise at the desired reaction temperature. After a short after-reaction the alkylation product is diluted with a solvent without being isolated, further quantities of the catalyst are added and terpene hydrocarbon is added dropwise to the resulting mixture. The catalyst that is added immediately before the introduction of terpene hydrocarbon is preferably the same as that introduced at the beginning of the reaction, but in principle another one of the above-mentioned Friedel-Craft's catalysts may be used. It is also possible to add the whole of the required quantity of catalyst to the phenol at the beginning of the process. In this case the total quantity of catalyst must be a little larger, for example, up to about 4%, calculated on the reaction mixture.

The working up of the reaction mixture is very simple. The catalyst may be decomposed with an aqueous alkali or alkaline earth solution, for example, sodium hydroxide solution, or with water or it may remain in the reaction mixture. Then the reaction mixture is advantageously freed from solvent and unreacted starting material by a distillation under reduced pressure. In cases in which the catalyst is a boron compound it is not absolutely necessary to decompose it with water or alkali solution. The boron compound is decomposed in the course of the distillation and the decomposition products are eliminated by the distillation. In this case the desired terpene phenolic resin remains behind as the only distillation residue. When other Friedel-Craft's catalysts are used they can advantageously be eliminated before the distillation by washing with water, aqueous acid or aqueous lye. However, the elimination of these catalysts before the distillation is not absolutely necessary. The catalyst material may remain in the reaction product and is then present in the distillation residue together with the resin after the distillation and can be separated from the resin by a washing with water, aqueous acid or alkali. The catalyst may also be decomposed by adding to it solid, anhydrous, basic alkali or alkaline earth compounds such as sodium hydroxide, calcium hydroxide or sodium carbonate and then stirring the whole. The solid decomposition products which form are separated by filtration from the resin solution.

The structure of the resins thus obtained is most probably that of a bisphenol of tricyclodecane, the tricyclodecane radical being linked in general to the phenol radicals in o- or p-position with respect to the hydroxyl groups of the latter. The o- and p-positions of the phenol radicals which after the alkylation are not yet occupied by the dicyclopentadiene, or a part of them, are substituted by the terpene hydrocarbon, one double bond of the terpene hydrocarbon being changed into a single carbon-carbon bond. In cases in which a phenol having one nucleus is used the resins have the following formula:

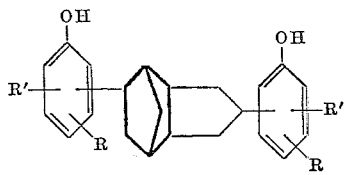

in which R is a terpene hydrocarbon radical, preferably a radical of the molecular formula $C_{10}H_{17}$, R' stands for H, a terpene hydrocarbon radical, preferably likewise a radical of the molecular formula $C_{10}H_{17}$, a hydroxyl group or an alkyl radical. The phenol nuclei may contain further alkyl radicals and/or hydroxyl groups. R stands in o- or p-position with respect to a hydroxyl group and R' likewise stands in o- or p-position with respect to a hydroxyl group in cases in which it represents a terpene hydrocarbon radical.

Bisphenols of the aforesaid structure are formed, for instance, when phenol, dicyclopentadiene and terpene hydrocarbon are reacted in a molar ratio of, for example, 2:1:4. In addition to the bisphenols polymer substances form in which phenolic radicals alternate with tricyclodecane radicals. These substances form in particular when the quantity of terpene hydrocarbon used is smaller than the quantity that would correspond to the free o- and p-positions of the phenol or when the ratio of phenol to dicyclopentadiene is reduced. Provided that these compounds are based on a phenol containing one nucleus they can be represented by the formula

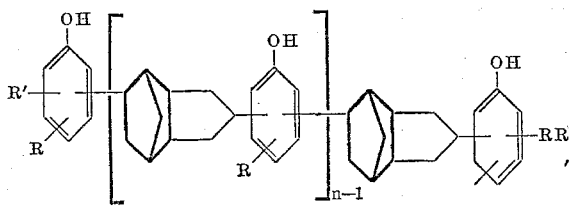

in which R and R' have the meanings given above and $n$ is a small integer, preferably 2, 3 or 4. In the compounds of this formula, too, the phenol radicals may contain further alkyl and/or hydroxyl groups. In cases in which $n$ stands for 1 the formula is identical with a simplified formula given above.

In the resins mentioned above part of the terpene radicals may be bound to the phenol by ether bonds. In the resins prepared with the use of camphene the portion of products containing ether bonds is very small.

The resins obtained by the process according to the invention may be used as antioxidizing agents for oil of turpentine and, moreover, they are valuable intermediary products.

The following examples serve to illustrate the invention but they are not intended to limit it thereto. The melting indexes mentioned in the examples were determined by the so-called capillary method according to DIN specification No. 53,181. The hydroxyl values were ascertained by determination of active hydrogen atoms and they are indicated in mg. of potassium hydroxide consumed per gram of substance. The molecular weight was ascertained ebullioscopically in benzene.

Example 1

(a) 376 grams (4 mols) of phenol were melted in a three-necked flask having a capacity of 4 liters and provided with stirring means, reflux condenser and dropping funnel. 10 grams of $BF_3.(CH_3COOH)_2$ were first added and then 264 grams (2 mols) of dicyclopentadiene were added dropwise at a temperature within the range of 100° to 120° C.

A strongly exothermic reaction set in. The mixture was stirred for 3 hours at 130° C. and then allowed to cool to 100° C. 700 cc. of dry xylene and another 10 grams of $BF_3.(CH_3COOH)_2$ were added. Then 1088 grams (8 mols) of molten camphene were added dropwise. After a three hours' afterreaction the solvent was distilled off in vacuo (about 20 mm. of mercury) while the temperature was slowly raised to 225° C. Together with the solvent, the decomposition products of the catalyst as well as unreacted reactants and oily reaction products distilled off. The resin was then poured into a disk. 1650 grams of a brownish black resin having a melting point within the range of 98° to 103° C., a hydroxyl value of 123.5 and a molecular weight of 699 were obtained.

(b) A reaction which was carried out in an analogous manner with the use of 544 grams (4 mols) of camphene yielded 1150 grams of a black brown resin having a melting point in the range of 103° to 109° C., a hydroxyl value of 162 and a molecular weight of 837.

(c) When 188 grams (2 mols) of phenol, 264 grams (2 mols) of dicyclopentadiene and 272 grams (2 mols) of camphene were reacted and the reaction was carried through in a manner analogous to that described in part (a) of this example, 700 grams of a dark brown resin having a melting point within the range of 88° to 94° C., a hydroxyl value of 130 and a molecular weight of 690 were obtained.

(d) A reaction carried out in a manner analogous to that described under (c) and in which 544 grams (4 mols) of camphene were used yielded 950 grams of a black brown resin having a melting point within the range of 84° to 90° C., a hydroxyl value of 110 and a molecular weight of 690.

Examples 2 to 6

Resins were prepared in a manner analogous to that described in Example 1(a) but instead of camphene various other terpene hydrocarbons were used. The characteristic values of the resins thus obtained are indicated in the following table.

| Example No. | Terpene | Yield (g.) | Melting point (° C.) | Hydroxyl value | Molecular weight |
|---|---|---|---|---|---|
| 2 | α-Pinene | 1,620 | 91–97 | 77 | 736 |
| 3 | β-Pinene | 1,600 | 97–101 | 79 | 863 |
| 4 | Dipentene | 1,540 | 93–97 | 80 | 742 |
| 5 | Sulfate turpentine oil [1] | 1,600 | 98–102 | 79 | 782 |
| 6 | Terpene mixture [2] | 1,600 | 97–102 | 80 | 815 |

[1] Composition—About 72% of α-pinene, 16% of β-pinene, 5% of Δ₃-carene, 4% of dipentene, 3% of β-cymene.

[2] Composition—About 20% of α-pinene, 50% of β-pinene, 20% of dipentene, 5% of carene, 5% of β-phellandrene.

Examples 7 to 11

In a manner analogous to that described in Examples 1(a) and 1(b) different phenols (4 mols in each case) were reacted with 264 grams (2 mols) of dicyclopentadiene and 544 grams (4 mols) of camphene. The characteristic values of the resins thus obtained can be seen from the following table.

| Example No. | Phenol | Yield (g.) | Melting point (° C.) | Hydroxyl value | Molecular weight |
|---|---|---|---|---|---|
| 7 | 576 g. of β-naphthol | 1,350 | 80–85 | 110 | 585 |
| 8 | 432 g. of p-cresol | 1,080 | 88–94 | 152 | 602 |
| 9 | 600 g. of p-sec. butyl-phenyl | 1,180 | 63–69 | 134 | 704 |
| 10 | 880 g. of isononyl phenol (mixture of isomers) | 1,470 | 50–55 | 114 | 600 |
| 11 | 488 g. of 1.2.4-xylenol | 950 | 72–77 | 153 | 572 |

Example 12

The experiment was carried out in a manner analogous to that described in Example 1(a) but instead of 376 grams (4 mols) of phenol 432 grams (4 mols) of m-cresol were used. 1450 grams of a dark brown resin having a melting point within the range of 75° to 80° C., a hydroxyl value of 107 and a molecular weight of 612 were obtained.

Example 13

The experiment was carried out in a manner analogous to that described in Example 1(a) but instead of 376 grams (4 mols) of phenol 440 grams (4 mols) of resorcinol were used. 1380 grams of a black brown resin having a melting point within the range of 120° to 127° C., a hydroxyl value of 246 and a molecular weight of 911 were obtained.

Example 14

376 grams (4 mols) of phenol were molten and 25 grams of pulverized anhydrous aluminium chloride were added while stirring. To the resulting suspension 264 g. (2 mols) of dicyclopentadiene were added dropwise at 100° C. Stirring was continued for 3 hours at 130° C. The whole was then cooled to 100° C. and diluted with 700 cc. of dry benzine boiling between 130° and 150° C. Another 25 grams of aluminium chloride were added and then 1088 g. (8 mols) of molten camphene were introduced at 120° C. The whole was stirred again for 3 hours at 130° C. The catalyst was destroyed at a temperature within the range of 70° to 80° C. by the addition of 500 cc. of H₂O. The aqueous layer was separated. The product was freed from the solvent by being distilled under reduced pressure until a temperature of 225° C. was attained. 1650 g. of a brown resin having a melting point within the range of 101° to 106° C., a hydroxyl value of 114 and a molecular weight of 761 were obtained.

We claim:
1. A compound of the formula

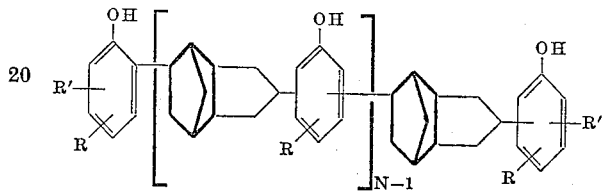

wherein
R is a terpene hydrocarbon radical of 10 carbon atoms in o- or p-position with respect to the hydroxyl group of each phenol radical;
R' is a member selected from the group consisting of a hydrogen, terpene hydrocarbon radical having 10 carbon atoms, alkyl having 1–5 carbon atoms and hydroxyl, the R' radical being in o- or p-position to the hydroxyl group of the phenol radical when defined as a terpene hydrocarbon; the tricyclodecane moiety being linked to the phenol radicals in o- or p-position with respect to the hydroxyl groups; and
n is an integer of 1–4.

2. A compound of the formula

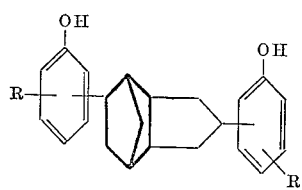

wherein
R is a camphane radical substituted in o- or p-position with respect to the hydroxl group of the phenol rings, the tricyclodecane moiety being linked to the phenol radicals in o- or p-position with repsect to the hydroxyl groups.

3. A terpene phenol as claimed in claim 2 wherein R represents a pinane radical.

4. Terpene phenol as claimed in claim 2 wherein R is a menthane radical.

5. A compound of the formula

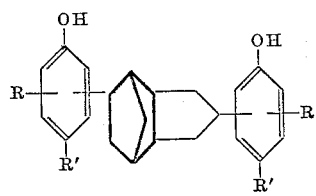

wherein
R is a camphane radical in o- or p-position with respect to the hydroxyl groups of the phenol rings; and R' is a hydrocarbon of 1–15 carbons atoms, the tricyclodecane moiety being linked to the phenol rings in o- or p-position to the phenol hydroxyl group.

6. A terpene phenolic resin of the formula

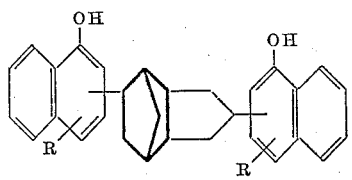

wherein
R is a camphane radical in o- or p-position with respect to the OH substituents, the tricyclodecane moiety being linked to the naphthol rings in o- or p-position with respect to the OH groups thereon.

7. Terpene phenol mixtures of the formula

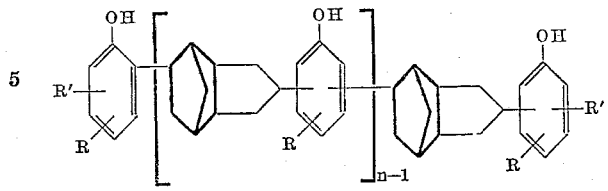

in which R represents a terpene hydrocarbon radical containing 10 carbon atoms, R' is a member selected from the group consisting of H, a terpene hydrocarbon radical containing 10 carbon atoms, a hydroxyl group and an alkyl group containing 1 to 15 carbon atoms and $n$ is an integer within the range of 1 to 4 and in which the tricyclodecane radicals are linked to the phenol nuclei not in m-position, the radical R standing in o- or p-position with respect to a hydroxyl group and R' standing in o- or p-position with respect to a hydroxy group when R and R' stand for terpene hydrocarbon radicals.

References Cited

UNITED STATES PATENTS 2,471,454   5/1949   Rummelsburg _____ 260—619
2,864,868  12/1958   Bader _____ 260—619 X LEON ZITVER, *Primary Examiner.*

D. M. HELFER, H. ROBERTS, *Assistant Examiners.*